United States Patent
Iwamura

[19]

[11] Patent Number: 5,937,395
[45] Date of Patent: Aug. 10, 1999

[54] ACCOUNTING APPARATUS, INFORMATION RECEIVING APPARATUS, AND COMMUNICATION SYSTEM

[75] Inventor: Keiichi Iwamura, Yokohama, Japan

[73] Assignee: Canon Kabushiki Kaisha, Tokyo, Japan

[21] Appl. No.: 08/706,491

[22] Filed: Sep. 4, 1996

[30] Foreign Application Priority Data

Sep. 5, 1995 [JP] Japan .................................... 7-227843

[51] Int. Cl.$^6$ .................................................. B42D 11/00
[52] U.S. Cl. .............................. 705/30; 705/18; 705/21; 235/379
[58] Field of Search ................................... 705/1, 17, 18, 705/21, 30; 235/375, 379, 381, 382

[56] References Cited

U.S. PATENT DOCUMENTS

| | | | |
|---|---|---|---|
| 4,370,649 | 1/1983 | Fuerle .................................... | 340/825 |
| 5,103,392 | 4/1992 | Mori ...................................... | 395/725 |
| 5,634,012 | 5/1997 | Stefik et al. ........................... | 395/239 |
| 5,650,604 | 7/1997 | Marcous et al. ...................... | 235/379 |

FOREIGN PATENT DOCUMENTS

| | | |
|---|---|---|
| 0 120 771 | 10/1984 | European Pat. Off. . |
| 60-77218 | 5/1985 | Japan . |
| 60-191322 | 9/1985 | Japan . |
| 64-68835 | 3/1989 | Japan . |
| 2-44447 | 2/1990 | Japan . |
| 4-64129 | 2/1992 | Japan . |
| 95/07592 | 3/1995 | WIPO . |

OTHER PUBLICATIONS

European Search Report dated Jun. 25, 1998.
T. Okamoto and A. Shiraishi, "A fast signature scheme based on quadratic inequalities", IEEE Symp. on Security and Privacy, pp. 123–132, Apr. 22–24, 1985.
A. Shamir and R. E. Zippel, "On the security of the Merkle–Hellman cryptographic scheme", IEEE Trans. on InF. Theory, May 1980, pp. 339–340.
S. Goldwasser, S. Micali and A. Yao, "Strong signature schemes", ACM Symp. on Theory of Computing, Apr. 25–27, 1983, pp. 431–439.
H. Ong, C. P. Schnorr and A. Shamir, "An efficient signature scheme based on quadratic equations", ACM Symp. on Theory of Computing, Apr. 30—May 2, 1984, pp. 208–216.
R. J. McEliece, "A public–key cryptosystem based on alegebraic coding theory", DSN Progress Rep. Jet Propulsion Lab. Jan.–Feb. 1978, pp. 114–116.
A. Shamir, "A fast signature scheme", report MIT/LCS/TM–107, MIT laboratory for computer science, Jul. 1978, pp. 1–17.
M. Rabin, "Digitalized signatures and public–key cryptosystems, MIT/LCS/TR–212, Technical Report MIT. Jan. 1979. pp. 1–16.
R. L. Rivest, A. Shamir and I. Adleman, A method of obtaining digital signatures and public key cryptosystems, Comm. of the ACM, 1978, pp. 120–126.

(List continued on next page.)

Primary Examiner—Thomas R. Peeso
Attorney, Agent, or Firm—Fitzpatrick, Cella, Harper & Scinto

[57] ABSTRACT

A communication system and accounting apparatus are provided capable of easy management of accounting a use of information by a user in multi-media networks while protecting privacy of the user. As a user input money information to an PPC input unit of a user terminal, the money information including cash, a pre-paid card, an IC card, and the like, a discrimination unit judges a use permission of provided information in accordance with the money amount indicated by the money information and/or charge information added to the information provided by an information provider. In response to a user permission signal, a signal processing unit processes the provided information and supplies it to the user.

22 Claims, 6 Drawing Sheets

OTHER PUBLICATIONS

R. C. Merkle and M. E. Hellman, "Hiding information and signatures in trapdoor knapsacks", IEEE Trans. on Inf. Theory, Sep. 1978, pp. 525–530.

A. Shamir and R.E. Zippel, "On the security of the Merkle–Hellman cryptographic scheme", IEEE Trans. on Inf. Theory, May 1980, pp. 339–340.

T. Matsumoto and H. Imai, "A class of asymmetric crypotosystems based on polynomials over finite rings", IEEE International Symp. on Information Theory, 1983, Sep. 1983, Abstracts, pp. 131–132.

H. C. Williams, "A modification of the RSA public–key encryption procedure", IEEE Trans. of Inf. Theory, Nov. 1980, pp. 726–729.

ACCOUNTING APPARATUS, INFORMATION RECEIVING APPARATUS, AND COMMUNICATION SYSTEM

BACKGROUND OF THE INVENTION

1. Field of the Invention

The present invention relates to an accounting apparatus, an information receiving apparatus, and a communication system used in a multimedia network or the like in which transferred is information including moving image data, still image data, voice data, computer data, computer program and the like, and particularly features in information provision and its accounting system.

2. Related Background Art

In the field of trunk communication networks, optical fiber networks have been consolidated, cable television systems have been developed, satellite communications have been used practically, and local area networks have been prevailed. Various types of information is provided by using such communication networks. Information service industries are becoming large which charge a toll in accordance with the quantity and contents of information. It is important for such industries to properly charge a toll of provided information.

Protection of information is not still perfect, and there is an issue of illegal use of information including programs, images, and voices. In order to prevent illegal use, a copy protection function is provided, a serial number check is performed, or other methods are performed. In the serial number check, a hardware serial number and a software serial number are compared with each other when each program is executed. The copy protection function is inconvenient when a backup is to be performed, and the serial number check is inconvenient for the management of serial numbers and sales.

A concept "super distribution" proposed by Ryouich Mori aims at protection of rights of a software proprietor (hereinafter called an information provider). This concept was embodied in Japanese Patent Application Laid-open Nos. 60-77218, 60-191322, 64-68835, 2-44447, 4-64129, and others. FIG. 1 illustrates the concept "super distribution" disclosed in Japanese Patent Application Laid-open No. 4-64129. An information provider P supplies proprietary software PPi (or PPj) to a user terminal station 10. The user terminal station 10 includes a discrimination or judging unit 11 and a storage unit 12. The discrimination unit 11 judges whether or not the software PP is permitted to use, by comparing a software identification number PIDi (or PIDj) with a user ID/condition. If usable, a use history of provided information is stored in the storage unit 12. The information provider P charges a toll of provided information (software PP) in accordance with the use history. Reference numeral "13" denotes a software service unit (SSU) including the above-described unites.

The "super distribution" system is, however, associated with the following problems.

(1) In the "super distribution" system, whether a user is a subscriber to an information provider is judged from data specific to the user such as a user ID. It is therefore necessary to prepare at least a storage unit for storing the data specific to users. Each user first asks for the information provider so as to receive a use permission and a user ID or the like, and then the user ID or the like is stored as the user specific data. Such a subscriber permission procedure is cumbersome and the management of specific data of a number of users requires much labor.

(2) In the "super distribution" system, the storage unit 12 for storing software use history is used for preventing illegal use of information and for managing the use state of information provided by the information provider. In accordance with the use history, the information provider asks for the user to pay a charge. In the "super distribution" system, information is not sold but rent so that the use history becomes necessary. However, with this system, the information provider knows the information provided to a user and privacy of the user cannot be protected.

(3) With the "super distribution" system, although the use state and charges of provided information can be correctly managed, a charge payment apparatus and method is not disclosed. Therefore, after the information provider checks the use state of provided information, the provider is required to ask for a charge and receive it by using another system.

SUMMARY OF THE INVENTION

It is an object of the present invention to solve the above problems (1) to (3).

It is another object of the present invention to provide a novel apparatus and system for receiving information from an information provider for counter value, capable of being compatible with protection of rights of the information provider and with convenience and protection of privacy of a user.

According to one aspect of the present invention achieving the above objects, there is provided an accounting apparatus comprising: input means for inputting money information indicating an amount of money; and judging means for judging the money information input from the input means and outputting a permission signal for permitting a use of information provided by an information provider.

According to another aspect of the present invention, there is provided a communication system comprising: an information provider terminal for providing information; a user terminal for receiving and using information provided by the information provider terminal; and an accounting unit inputted with money information and having judging means for judging the input money information, and outputting a permission signal for permitting a use of information provided by an information provider.

The above and other objects and features of the present invention will become apparent from the following detailed description of embodiments when read in conjunction with the accompanying drawings.

DETAILED DESCRIPTION OF THE PREFERRED EMBODIMENTS

Embodiments of the present invention will be described with reference to FIGS. 2 to 10.

The first embodiment of the invention will be described with reference to FIG. 2.

Figure 1:
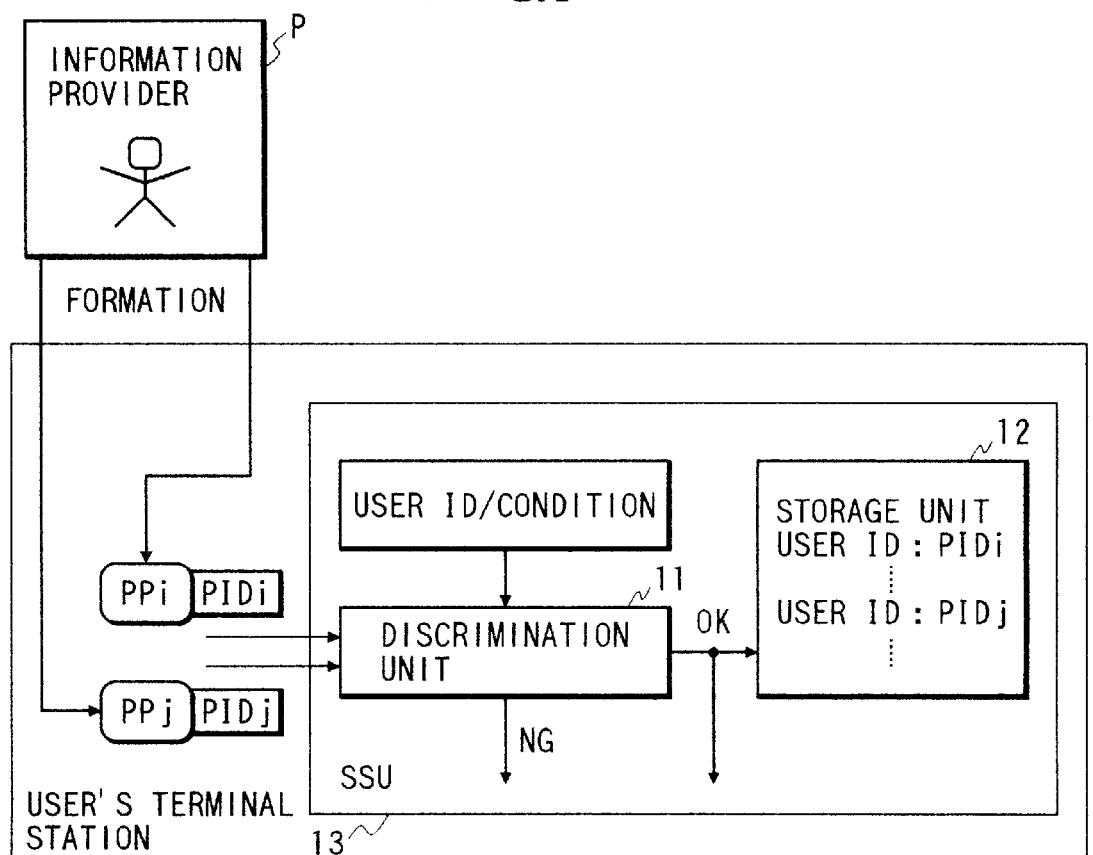
FIG. 1 is a block diagram illustrating a conventional super distribution system.
Figure 2:
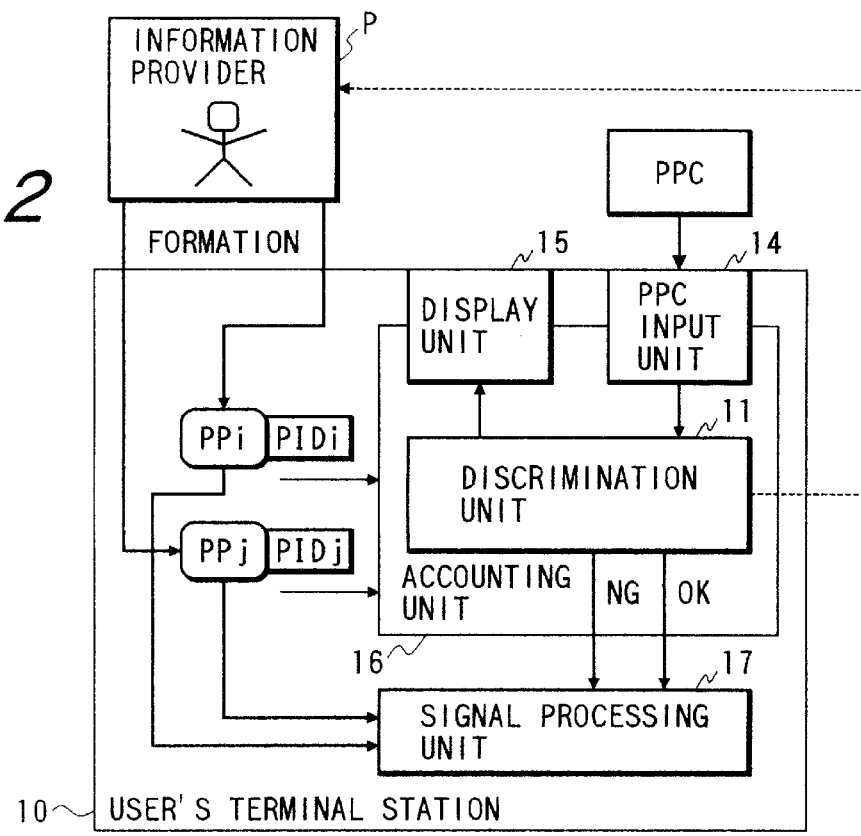
FIG. 2 is a block diagram showing a charging apparatus and an information receiving apparatus according to a first embodiment of the invention.

In FIG. 2, reference numeral 10 represents a user's terminal station as an information receiving apparatus, P represents an information provider, PPi (or PPj) represents information provided by the information provider P for counter value, PIDi (or PIDj) represents data added to and specific to PPI, PPC represents money information such as cash and card to be described later, reference numeral 14 represents a PPC input unit, reference numeral 15 represents a display unit, reference numeral 16 represents an accounting unit 16 including the PPC input unit 14, display unit 15 and a discrimination or judging unit 16 for judging whether or not the provided information PP is permitted to use, and reference numeral 17 represents a signal processing unit.

The operation will be described next.

The information provider P provides the information PP including PID. The user's terminal station 10 is configured so that the accounting unit 16 is always used when the provided information PP is used. The accounting unit 16 has the input unit 14 for receiving the money information PPC. When an event of using the provided information PP occurs, the discrimination unit 11 checks a use permission of the provided information PP in accordance with the PID and/or PPC. For example, it is checked whether or not a use charge contained in PID is equal to or smaller than the balance indicated by the money information PPC. A permission (OK) or a refusal (NG) is notified to the signal processing unit 17. If permitted, the signal processing unit 17 operates so that the user can use the provided information PP. Information (a use charge toll of the provided information, a balance of PPC, and the like) on PID and PPC is displayed on the display unit 15. The use judgement result by the discrimination unit 11 may be displayed on the display unit 15.

In this invention, the money information PPC may be cash, a pre-paid card like a telephone card, electronic money information stored in a floppy disk, an IC card, or a PCMCIA card. In this invention, instead of utilizing a user ID specific to the user, the money information PPC not specific to the user is utilized in order to judge whether or not the provided information PP is permitted to use. Therefore, a user is not requested to provide a user ID. Only the money information PPC is given, i.e., only a use charge of the provided information is paid. This procedure is natural and easy. It is not necessary therefore to manage a large amount of user specific information, and so the problem (1) can be solved.

In this invention, since the user specific data is not given, privacy of using provided information cannot be supplied to the information provider. This may sound that the rights of the information provider P are not protected. However, it is sufficient if only the charge corresponding to the use occurrence frequency is paid to the information provider P, and the privacy of using provided information is not necessary to be supplied to the information provider P. Although the invention does not use a use history storage unit for storing the information that which PID is used by a user having what ID, the invention may have a use occurrence frequency storage unit for storing the information that which information is used what times and a use notice unit for notifying a current use of provided information. In FIG. 2, use occurrence frequency is notified to the information provider P via a path indicated by a broken line. The details of the use occurrence frequency unit and use notice unit will be given in the second to sixth embodiments. The problem (2) of user privacy can therefore be solved.

In this embodiment, PPC is money information and can pay a charge by using PPC so that the problem (3) can be solved. Particular examples of how PPC can be obtained, collected, and how charges are distributed to each information provider will be described together with the problem (2) in the second to sixth embodiments.

The accounting unit 16 constitutes an accounting apparatus of this invention. Although the accounting unit 16 is provided integrally with the user's terminal station 10, this may be provided separately from the user's terminal station 10. In this case, the accounting unit 16 first receives the information PID added to the information PP provided by the information provider P, and in response to a signal indicating a permission judged based on PID and PPC by the discrimination unit 11, the user terminal 10 is permitted to receive the provided information PP and to process signals. This arrangement may also be applied to the second to eighth embodiments to be later described.

The second embodiment will be described with reference to FIG. 3.

Figure 3:
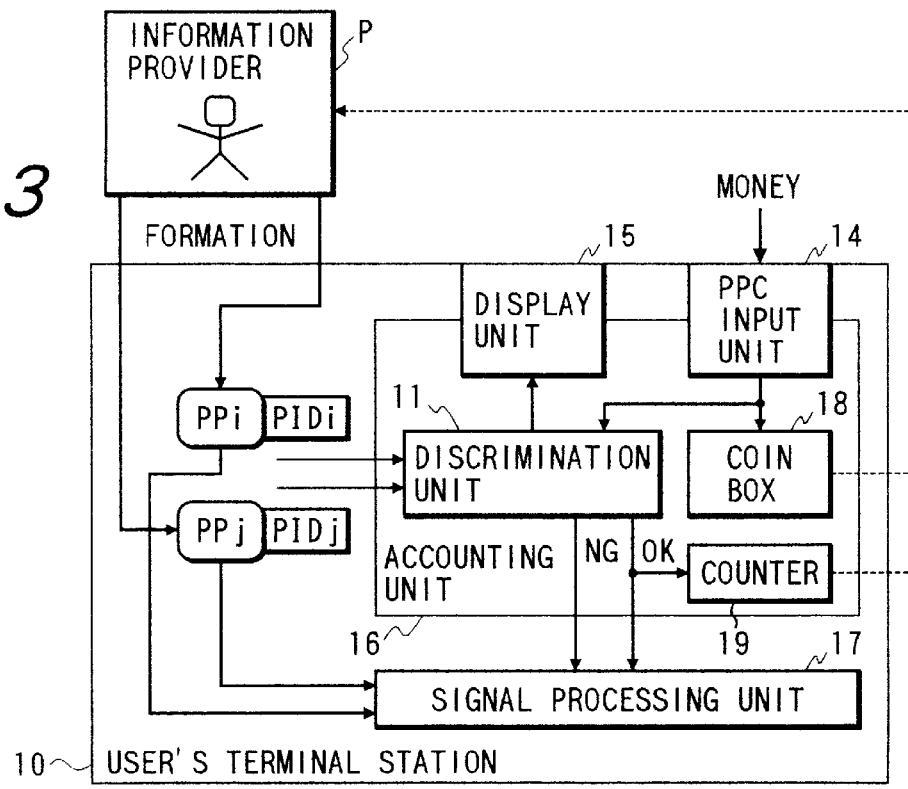
FIG. 3 is a block diagram showing a charging apparatus and an information receiving apparatus according to a second embodiment of the invention.

In the embodiment shown in FIG. 3, PPC is cash. In this case, the input unit 14 has an inlet of a coin and paper currency. A user first inputs a certain amount of money to the input unit 14. If the input money exceeds the charge indicated by PID, the discrimination unit 11 permits to use the provided information PP. In an alternative structure, the accounting unit 16 displays a use charge of the provided information on the display unit 15, and the user inputs a corresponding money to the input unit 14. In accordance with the input money, the discrimination unit 11 checks whether or not the provided information PP can be permitted to use. In a further alternative structure, if a charge is changed with a use time, this effect is displayed and an additional charge is input. The input money is stored in a coin box 18 and is collected by the information provider or some other bodies which collect money. A use occurrence frequency of each piece of provided information PP is recorded by a counter 19, and the collected charges in the coin box 18 are distributed to each information provider P in accordance with the use occurrent frequencies. If only one piece of provided information PP is used and a use occurrence frequency is not necessary to be counted, the counter 19 may be omitted.

Next, the third embodiment will be described with reference to FIG. 4.

Figure 4:
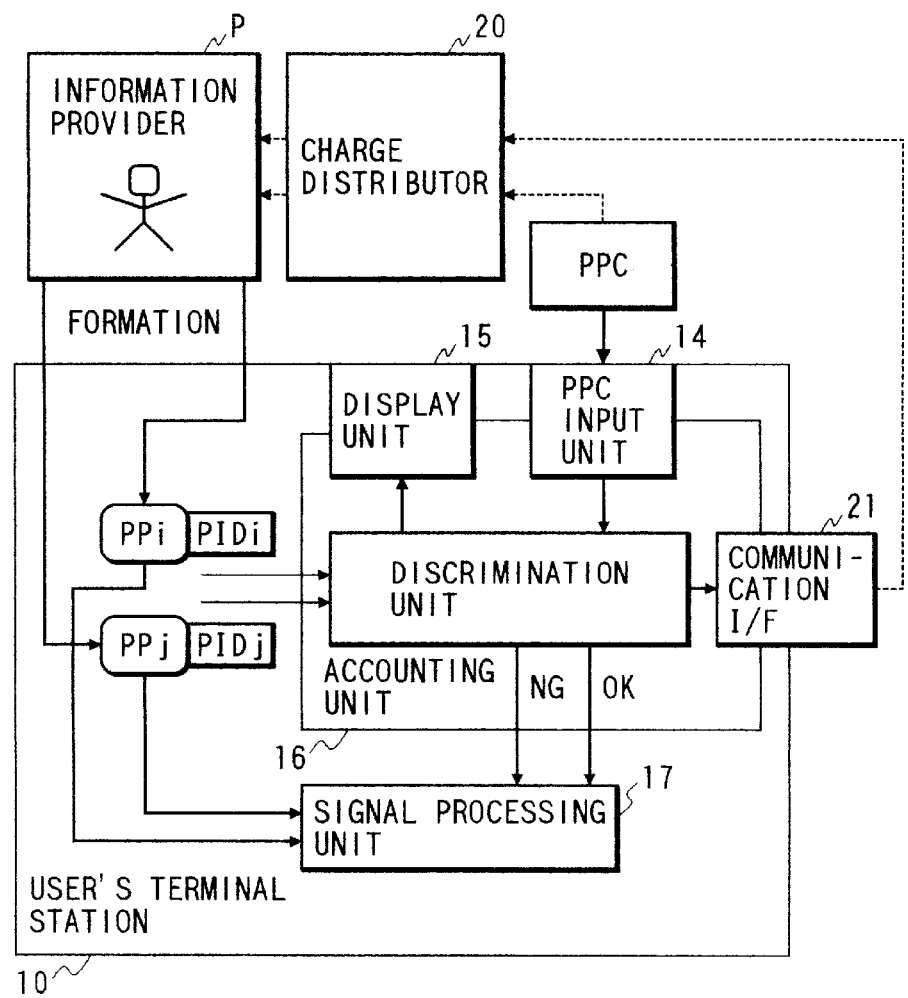
FIG. 4 is a block diagram showing a charging apparatus and an information receiving apparatus according to a third embodiment of the invention.

In the third embodiment shown in FIG. 4, PPC is a pre-paid card such as a telephone card. A user inserts a pre-paid card into the PPC input unit 14. The discrimination unit 11 judges whether or not the money recorded in the pre-paid card is larger than the use charge, and if larger, use of PP is permitted. In this example, the use charge is displayed on the display unit 15. In this embodiment, the discrimination unit 11 and PPC input unit 14 are structured so that, even if the use charge of PP is changed with time, if the charge is smaller than the money recorded in the pre-paid card, PP can be used continuously. If the input unit 14 is structured so as to allow an additional pre-paid card to be inserted, PP can be used for a longer time period.

Such a pre-paid card can be easily bought from one of pre-paid card retail shops like as in the case of telephone cards. The manufacturer of pre-paid cards is a charge distributor 20. Each information provider is registered to the charge distributor 20 and receives charges in accordance with a use occurrence frequency of provided information PP. The charge distributor 20 includes pre-paid card retail shops.

Figure 5:
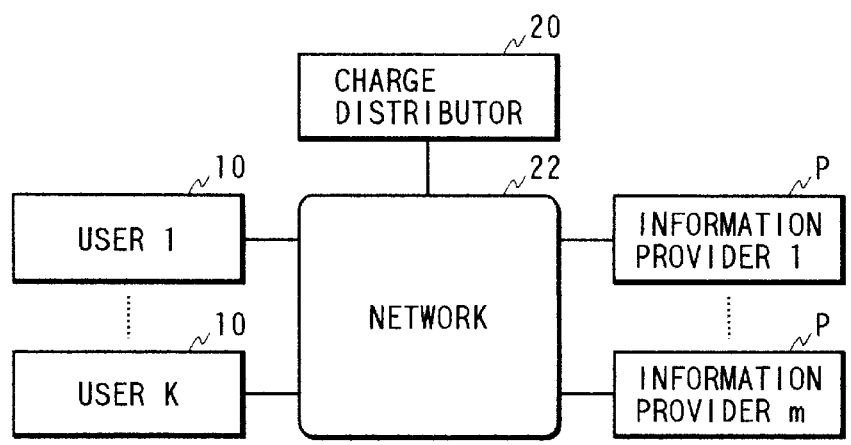
FIG. 5 is a block diagram showing a communication system with the charging apparatus and information receiving apparatus of the third embodiment.

Distribution of charges corresponding to use occurrence frequencies is realized by notifying current use information from the accounting unit 16 to the charge distributor 20 via a communication I/F 21. This use notice is issued only when the accounting unit 16 changes the money recorded in the pre-paid card. If the provided information PP is received via communications, this communication I/F 21 can be shared. In this case, as shown in FIG. 5, a terminal of the charge provider 20, a terminal of the information provider P, and the user's terminal 10 are connected to a network 22. The charge distributor 20 distributes charges to information providers P in accordance with the above-described notice.

If the communication I/F 21 is not used, a pre-paid card different for each piece of provided information may be used. In this case, the discrimination unit 11 checks the type of each pre-paid card and judges whether or not the provided information can be permitted to use. Alternatively, the accounting unit 16 may be provided with means for recording a use of provided information PP in a pre-paid card. In this case, the charge distributor 20 collects pre-paid cards and distributes charges in accordance with use occurrence frequencies. In order to promote collection of pre-paid cards, the following system may be incorporated. Namely, if a new pre-paid card is bought by replacing it by the old pre-paid card, only the money recorded in the new-pre-paid card is paid, whereas if a new pre-paid card is not bought, a charge only for the pre-paid card itself is paid. Charges used by pre-paid cards not collected may be distributed in accordance with ratios of charges used by pre-paid cards already collected.

Figure 6:
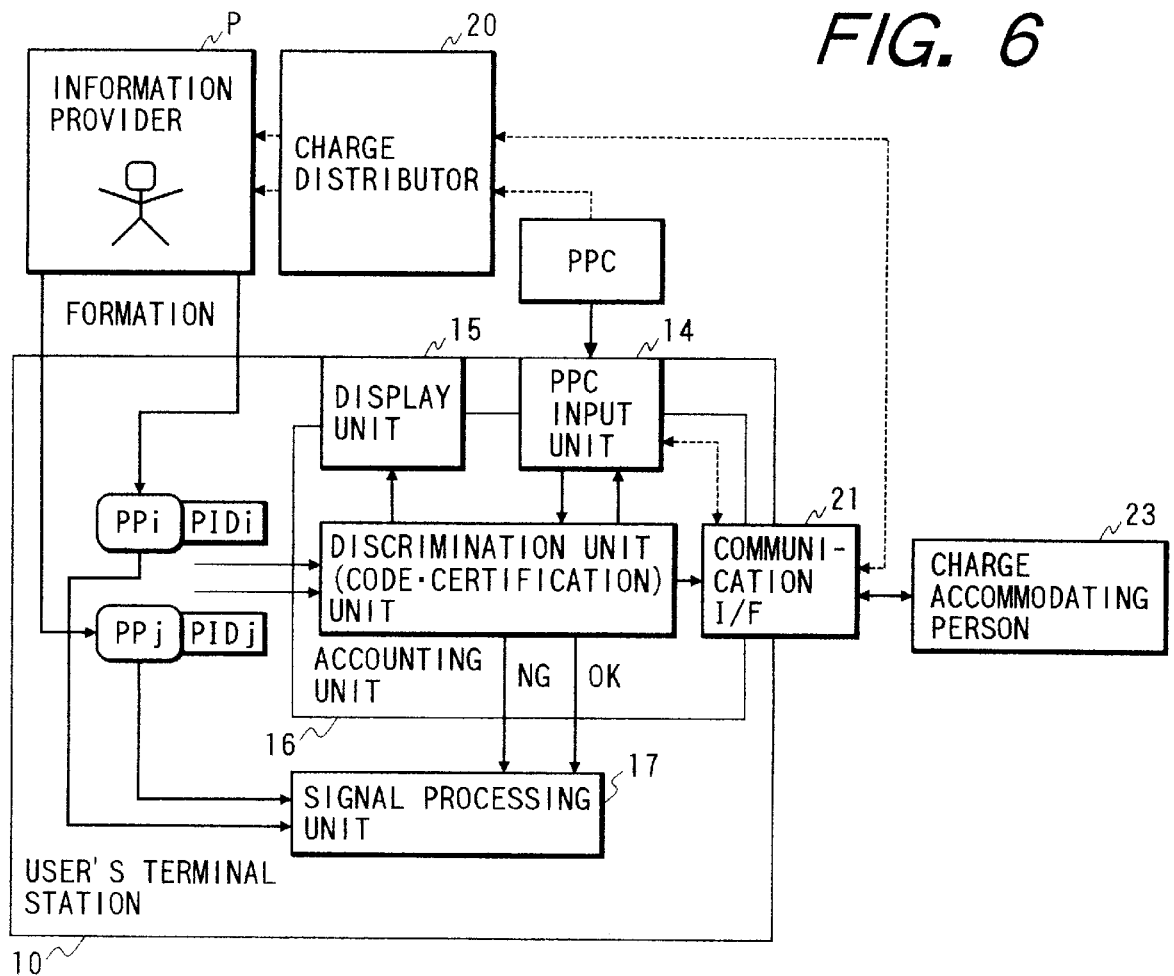
FIG. 6 is a block diagram showing a charging apparatus and an information receiving apparatus according to a fourth embodiment of the invention.
Figure 7:
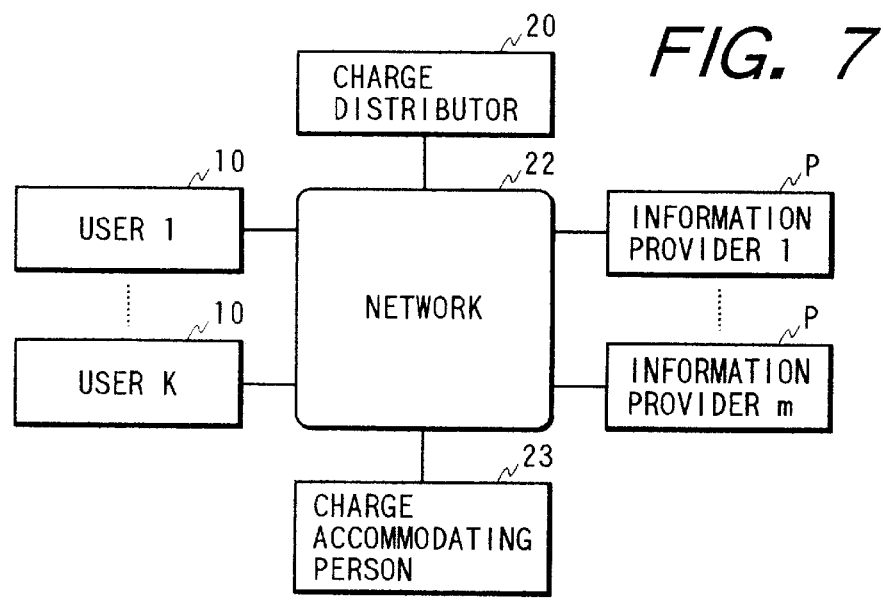
FIG. 7 is a block diagram showing a communication system with the charging apparatus and information receiving apparatus of the fourth embodiment.

FIG. 6 shows the fourth embodiment in which PPC is a floppy disc or an electronic and/or magnetic storage device easy to be rewritten. The network system using the fourth embodiment is shown in FIG. 7.

Money information stored in PPC is specific data certified by banks or other financial bodies or allowed to add money information only by the charge distributor 20 including retail shops. A user inserts a PPC into the input unit 14. The accounting unit 16 reads money information from PPC, and if the read money information is larger than the charge recorded in PID which may be displayed and if the accounting unit 16 can claim payment from PPC, then the discrimination unit 11 permits to use PP. In this case, even if the use charge is changed with time, the provided information PP can be used continuously so long as the charge is smaller than the money information recorded in PPC.

Since the money information is electronic money information, the charge distributor 20 can input or output the money information via the communication I/F in accordance with a predetermined procedure. Different from the first and second embodiments, a user does not pay cash to the charge distributor 20. Insurance of payment by a user is made by banks or other financial bodies (hereinafter called a charge accommodation person 23) contracted with the user. Similar to the third embodiment, current use information is notified to the charge distributor 20 via the communication I/F 21 to distribute charges in accordance with use occurrence frequencies. In this case, a use charge may be sent directly to the charge distributor 20 or information provider by using the electronic money information PPC.

Specifically, input/output of the electronic money information can be achieved by the following communication procedure. It is assumed here that the accounting unit 16 has code/certification means to be described later and means for security management of time stamps represented by TA to be described later. These means are provided for the certification of PPC and prevention of illegal copy or the like of PPC under the management of time stamps, because PPC is a medium such as a floppy disk easy to be rewritten.

The accounting or charging process will be described assuming that each of a user "A", information provider "B", charge distributor "C", and charge accommodating person "D" has a secret key capable of signature and a communication partner has a public key capable of inspection of the signature, where the secret key of "A" is represented by "sA", and the public-key of "A" is represented by "pA". Consider now that "A" uses information Pi provided by "B". The process result by "X" using a key "Y" is represented by $\{X\}^\wedge Y$ and the management of each process of a user, a key, and time stamps is assumed to be made by means provided in the accounting unit 16 and having certified security, or by a memory or record of the user.

Money Information Input Process (1) "A" sends an input request message MA for money information of a yen (money denomination is not limited only to yen) to "C", by adding registration information "iA" of "A" (such as account number and credit number) and with a signature by the secret key "sA".

$$MA=\{A, \{A, iA, a, TA\}^\wedge sA\}$$

(2) "C" inspects the signature of MA by using the public key of "A", and claims payment of "a" yen to "D" by using the registration information "iA". If the payment is acknowledged, "C" sends the following message MC to "A" with a signature by the secret key "sC" of "C" for each yen of the money information "a" or for each basic unit "c" (for each 100 yen if the provided information has a charge in the unit of 100 yen). Each yen or each basic unit is added with a different time stamp TCi.

$$MC=\Sigma\{TA, \{C, e, TCi\}^\wedge sC\}^\wedge pA$$

(3) "A" decodes each of MC by using "pA" and inspects the signature by the public key pC of "C" corresponding to "sC". If the inspection shows a correct signature, $\{C, a, TCi\}^\wedge sC$ is written in PPC.

TA and TCi indicate a time stamp. A message having the same time stamp of the same transmitter is judged as an illegal request. TA and TCi may not be a time stamp, but may be a serial number or a random number with no or less coincidence between random numbers.

Use Information Notice Process (1) If "A" wants to use information Pi, the accounting unit 16 permits to use Pi on the assumption that the money information in PPC of "A" is larger than the charge recorded in PIDi.

(2) After "A" terminates the use of Pi or during the use, the accounting unit 16 erases the required charge from the money information PPC.

(3) At this time, "A" sends the following use message MB to "C" where "b" is the erased use charge.

MB={A, B, {B, b, TB} ^ sA}

(4) "C" inspects this message and if correct, "b" yen is paid as distributed money to "B".

In the above description, a public key cryptosystem is used between "C" and each user in order to simplify the process. Obviously, a common key cryptosystem using a common key may be used. The effective term of each message may be determined from a lapse time from a time stamp. In the above description, the order of data element in each message may be irregular, and in some cases an ID number of a user A, B . . . and time stamps are not always necessary. The above money information input process and use information notice process are only illustrative, and the accounting process by electronic money information without using data specific to a user falls within the scope of the invention.

If the communication I/F is not provided, a user goes to the charge distributor 20 including retail shops and pays money corresponding to the money information stored in PPC to thereby obtain the money information. Charges can be distributed in accordance with use occurrence frequencies by collecting the use record in PPC of the provided information PP recorded by the accounting unit 16 as in the case of the message MB, when the user goes to the charge distributor 20 including retail shops to supplement the money information. As above, since the electronic money information is specific data capable of being processed only by the charge distributor 20, the user having no communication I/F 21 is required by all means to go to the charge distributor 20 including retail shops in order to change the contents of PPC. Therefore, the use record can be collected and charges can be distributed in accordance with use occurrence frequencies.

Figure 8:
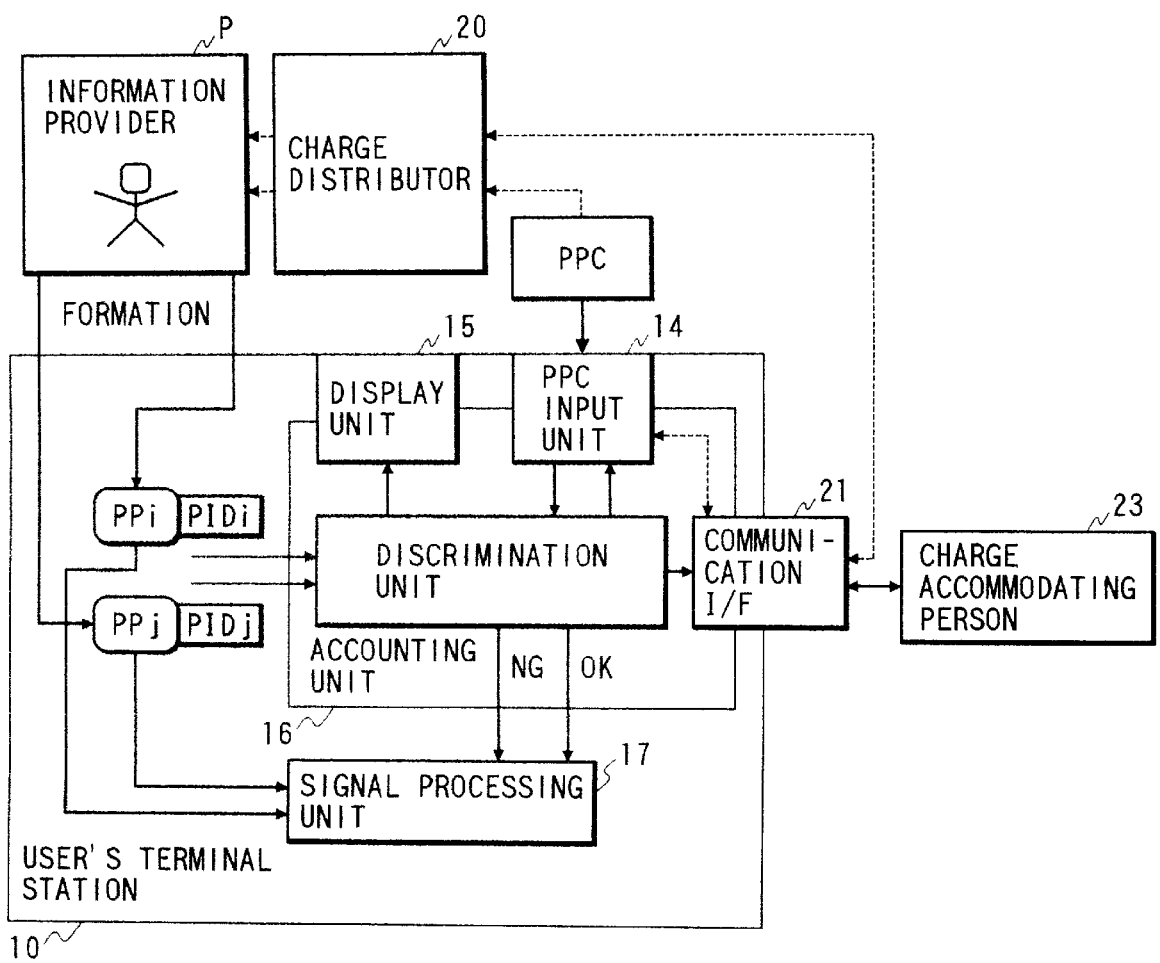
FIG. 8 is a block diagram showing a charging apparatus and an information receiving apparatus according to a fifth embodiment of the invention.

FIG. 8 shows the fifth embodiment in which PPC is an electronic card such as an IC card and a PCMCIA card. The structure of the network system using the fifth embodiment is the same as that shown in FIG. 7. Money information stored in PPC is specific data certified by banks or other financial bodies or allowed to add money information only by the charge distributor 20 including retail shops. A user inserts a PPC into the input unit 14 to activate PPC by a predetermined process (such as inspection of a password). The accounting unit 16 reads money information from PPC, and if the read money information is larger than the charge recorded in PID which may be displayed and if the accounting unit 16 can claim payment from PPC, then the discrimination unit 11 permits to use PP. In this case, even if the use charge is changed with time, the provided information PP can be used continuously so long as the charge is smaller than the money information recorded in PPC.

Since the money information is electronic money information, the charge distributor 20 can input or output the money information via the communication I/F 21 in accordance with a predetermined procedure. Different from the first and second embodiments, a user does not pay cash to the charge distributor 20. Insurance of payment by a user is made by banks or other financial bodies, i.e., by the charge accommodation person 23 contracted with the user. Similar to the third embodiment, current use information is notified to the charge distributor 20 via the communication I/F 21 to distribute charges in accordance with use occurrence frequencies. In this case, a use charge may be sent directly to the charge distributor 20 or information provider P by using the electronic money information PPC.

Specifically, input/output of the electronic money information can be achieved by the following communication procedure. It is assumed here that for the purpose of security of communications and processes, a user of the electronic card used as PPC can be confirmed by a password, an access to the data memory of PPC can be controlled by the access condition, and the cryptosystem can perform cipher and certification operations to be described later. It is also assumed that a secret key used for cipher and certification is written in the access controlled memory region and only a person (card issuing person, charge distributor, and the like) satisfying the access condition can only access. It is assumed that the following charging operations cannot be changed except by the card issuing person or charge distributor 20.

The user's terminal station 10, the terminal of the information provider P, the terminal of the charge distributor 20, and the terminal of the charge accommodating person 23 are connected to the network 22 as shown in FIG. 7. A user is represented by "A", an information provider is represented by "B", a charge distributor is represented by "C", and a charge accommodating person is represented by "D". "C" has secret keys for cipher communications to each user (e.g., a secret key "sA" between "A" and "C", a secret key "sB" between "B" and "C") and a secret key "sC" known only by "C" and a corresponding inspection key "pC" for signature is made public. Consider now that "A" uses information Pi provided by "B". The cipher sentence of a plain sentence "X" using a key "Y" is represented by {X} ^ Y and each process of a user is assumed to be performed in PPC having a security function.

Money Information Input Process (1) "A" sends an input request message MA for money information of a yen (money denomination is not limited only to yen) to "C", by adding registration information "iA" of "A" to "D" (such as account number and credit number).

MA={A, {A, iA, a, TA} ^ sA}

(2) "C" deciphers the enciphered portion of MA by using the shared "sA" and claims payment of "a" yen to "D" by using "iA". If the payment is acknowledged, "C" gives the money information "a" a signature by using the signature key "sC" and sends the following message to "A".

MC={TA, {C, a, TC} ^ sC} ^ sA (3) "A" deciphers MC by using "sA" and inspects the signature by the public key pC of "C" corresponding to "sC". If the inspection shows a correct signature, the money information of "a" yen is added to PPC.

TA and TCi indicate a time stamp. A message having the same time stamp of the same transmitter is judged as an illegal request. TA and TC may not be a time stamp, but may be a serial number or a random number with no or less coincidence between random numbers.

Use Information Notice Process (1) If "A" wants to use information Pi, the accounting unit 16 permits to use Pi on the assumption that the money information in PPC of "A" is larger than the charge recorded in PIDi.

(2) After "A" terminates the use of Pi or during the use, the accounting unit 16 subtracts the required charge from the money information PPC and the result is written in PPC.

(3) At this time, "A" sends the following use message MB to "C" where "b" is the subtracted use charge.

MB={A, {B, b, TB} ^ sA}

(4) "C" deciphers this message and if correct, "b" yen is paid as distributed money to "B".

If information is transferred between "A" and "B" by using cipher, the following processes are performed between the money information input process and use information notice process. It is assumed that "C" shares a secret key also with the information provider "B".

Information Use Process (1) "A" sends the following message MA' to "C" to ask for the generation of a speech key with "B".

MA'={A, B, TA'}

(2) "C" generates the speech key CK and sends the following message MC' to "A".

MC'={{TC', A, CK} ^ sB, TA', B, CK} ^ sA (3) "A" deciphers MC' by using "sA" and sends {TC', A, CK} ^ sB to "B".

(4) "B" deciphers the received message by using "sB" and information enciphered with the speech key CK is sent to "A".

(5) "A" deciphers the enciphered information using the speech key CK.

In the above description, a common key cryptosystem is used between "C" and each user in order to simplify the process. Obviously, a public key cryptosystem may be used similar to the fifth embodiment. The effective term of each message may be determined from a lapse time from a time stamp. In the above description, the order of data element in each message may be irregular, and in some cases an ID number of a user A, B, . . . and time stamps are not always necessary. The above money information input process and use information notice process are only illustrative, and the accounting process by electronic money information without using data specific to a user falls within the scope of the invention.

If the communication I/F is not provided, a user goes to the charge distributor 20 including retail shops to make the money information be written in PPC. Charges can be distributed in accordance with use occurrence frequencies by collecting the use record in PPC of the provided information PP recorded by the accounting unit 16, when the user goes to the charge distributor 20 including retail shops to supplement the money information. As above, since the electronic money information is specific data capable of being processed only by the charge distributor 20, the user having no communication I/F 21 is required by all means to go to the charge distributor 20 including retail shops in order to change the contents of PPC. Therefore, the use record can be collected and charges can be distributed in accordance with use occurrence frequencies.

Figure 9:
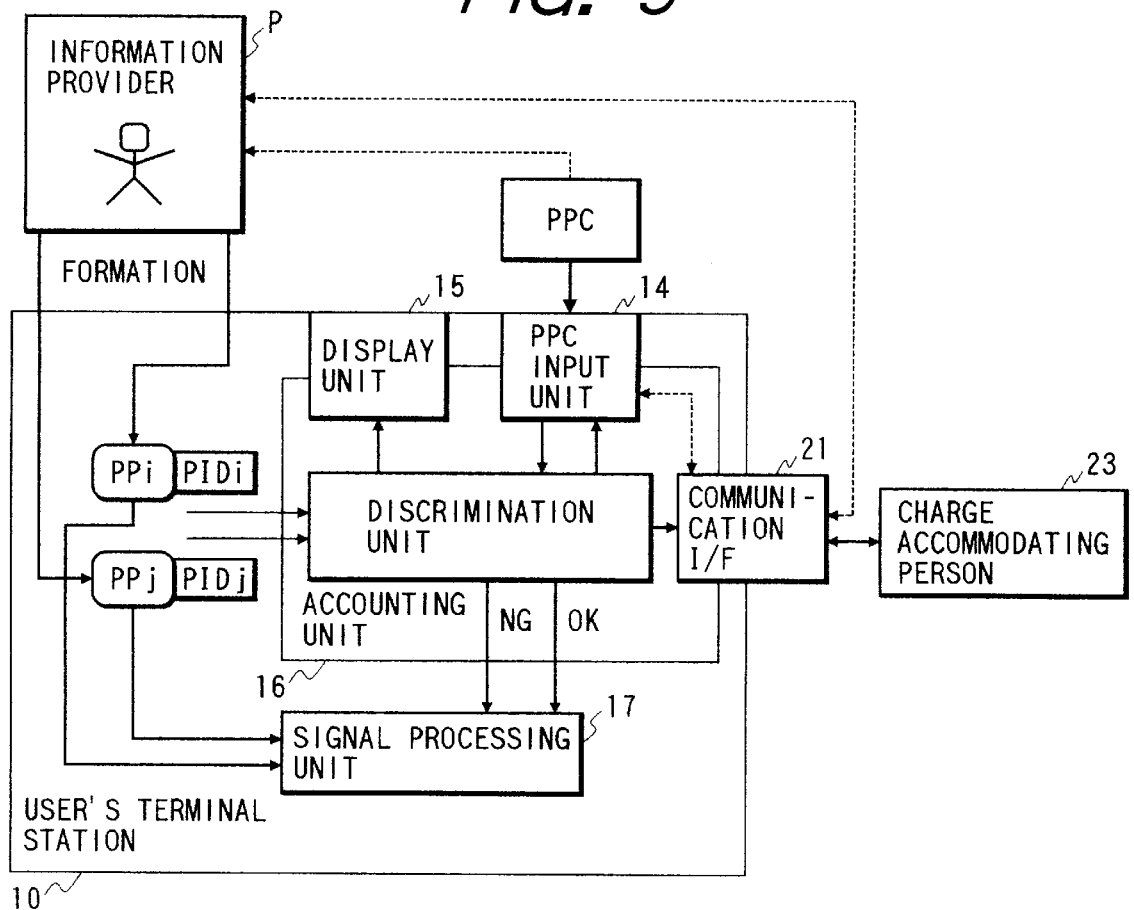
FIG. 9 is a block diagram showing a charging apparatus and an information receiving apparatus according to a sixth embodiment of the invention.
Figure 10:
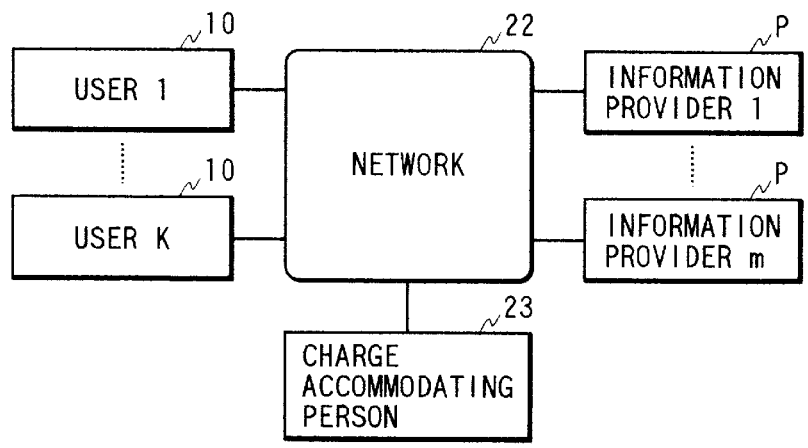
FIG. 10 is a block diagram showing a communication system with the charging apparatus and information receiving apparatus of the sixth embodiment.

FIG. 9 shows the sixth embodiment in which similar to the fifth embodiment, electronic information is used for the money information and the charge distributor 20 is not necessary.

The user's terminal station 10, the terminal of the information provider P, and the terminal of the charge accommodating person 23 are connected to the network 22 as shown in FIG. 9. It is assumed here that a user of the electronic card used as PPC can be confirmed by a password, an access to the data memory of PPC can be controlled by the access condition, and the cryptosystem can perform cipher and certification operations. It is also assumed that a secret key used for cipher and certification operations is written in the access controlled memory region. It is assumed that the following accounting operations cannot be changed except by the card issuing person.

A user is represented by "A", an information provider is represented by "B", and a charge accommodating person is represented by "D". It is assumed each has a secret key capable of signature and the communication partner knows the public key capable of inspecting signature (e.g., a secret key "sA" of "A" and the public key "pA" of "A"). Consider now that "A" uses information Pi provided by "B". The process result by "X" using a key "Y" is represented by {X} ^ Y and each process of a user is assumed to be performed in PPC having a security function.

Money Information Input Process (1) "A" sends an input request message MA for money information of a yen (money denomination is not limited only to yen) to "D", by adding registration information "iA" of "A" (such as account number and credit number).

MA={A, {A, iA, a, TA} ^ sA}

(2) "D" inspects the signature of MA by using the public key "sA" of "A", and if "iA" is correct and "A" can pay "a" yen, gives the money information "a" a signature, and sends the following message to "A".

MD={TA, {D, a, TD} ^ sD} ^ sA (3) "A" inspects MD by using "pA" and inspects the signature by the public key pD of "D" corresponding to "sD". If the inspection shows a correct signature, the money information of "a" yen is added to PPC.

TA and TD indicate a time stamp. A message having the same time stamp of the same transmitter is judged as an illegal request. TA and TD may not be a time stamp, but may be a serial number or a random number with no or less coincidence between random numbers.

Use Information Notice Process (1) If "A" wants to use information Pi, the accounting unit 16 permits to use Pi on the assumption that the money information in PPC of "A" is larger than the charge recorded in PIDi.

(2) After "A" terminates the use of Pi or during the use, the accounting unit 16 subtracts the required charge from the money information PPC and the result is written in PPC.

(3) At this time, "A" sends the following use message MB to "B" where "b" is the subtracted use charge.

MB={A, B, {B, b, TB} ^ sA}

(4) "B" inspects the signature and if correct, receives "b" yen by showing the signature of "A" {B, b, TB} ^ sA to "D".

If information is transferred between "A" and "B" by using cipher, although cipher communication can be performed directly by using the partner public key, if the amount of information is large, the cipher communication using the common key may be performed as in the following. In the following processes (1) and (2), "A" and "B" may be interchanged.

Information Use Process (1) "A" sends the common key CK with "B" by enciphering with the public key "pB" of "B".

MA'={A, B, CK, TA'} ^ pB (2) "B" deciphers the received message by using "sB".

(3) "B" sends information ciphered by using the common key CK to "A".

(4) "A" deciphers the received information by using the common key CK.

In the above description, a public key cryptosystem is used between "D", each user, and the information provider P for the purpose of simplicity. Obviously, the common key cryptosystem may be used. The effective term of each message may be determined from a lapse time from a time stamp. In the above description, the order of data element in each message may be irregular, and in some cases an ID number of a user A, B, . . . and time stamps are not always necessary. The above money information input process and use information notice process are only illustrative, and the accounting process by electronic money information without using data specific to a user falls within the scope of the invention.

Next, other embodiments will be described.

Seventh Embodiment

The accounting unit of the second embodiment using cash may be applied to an accounting system having one or more user's terminal stations. This accounting system may be installed by the information provider P or charge distributor 20 at locations where a number of people gather, such as a public telephone booth, a game center, a tea shop, and a library. People can receive information by paying cash.

The accounting unit of the third embodiment using a pre-paid card may be applied to an accounting system wherein the information provider P widely distributes information PP by means of CD-ROMs, personal computer communications or the like, the charge distributor 20 may be some copyright association which manufactures and sells pre-paid cards, and a user buys the pre-paid card at a retail shop or the like to receive provided information PP at home or other terminals.

The accounting unit of the fourth embodiment using a floppy disk may be applied to an accounting system wherein a specific PPC input unit 14 such as used by the third embodiment is not necessary because the user's terminal station is generally equipped with a floppy disk input unit 14, retail shops are not necessary because the money information can be given through communications, and the cipher and certification operations are performed by using software. This accounting system can be easily realized by using current network systems.

The accounting unit of the fifth embodiment using an electronic card such as an IC card and a PCMCIA card may be applied to an accounting system whose security function is more reliable than the accounting system using the fourth embodiment.

The accounting unit of the sixth embodiment may be applied to an accounting system wherein the charge distributer 20 is not necessary and the user and information provider P contract directly through the charge accommodating person 23. The accounting unit and accounting system is obviously applicable to an electronic money using specific data which is expected to be practically used in near future.

The scope of the invention also includes combinations of accounting units and accounting systems.

Eighth Embodiment

In a presently known accounting scheme, an information provider stores a plurality set of information enciphered by different keys in a CD-ROM. A CD-ROM itself is sold at a low price at a retail shop. If a user requests some information, the information provider teaches a cipher key of that information and receives some charge. With this scheme, however, a retail shop receives a fraction of sales profit of CD-ROM excepting a charge of provided information.

This problem can be solved by using the PPC accounting unit of this invention not as renting the information but as selling it. Specifically, a user buys both a CD-ROM and PPC such as a pre-paid card. The pre-paid card is used when an encipher key is taught from the information provider via communications (telephone or the like). The information provider receives the charge from the retail shop. In this manner, the retail shop can gain some profits also from the provided information. In this case, the accounting unit 16 checks the PPC money information and if a use of the provided information is permitted, it subtracts the use charge from PPC when the information is deciphered. If PPC is not used, the money can be paid back. PPC is manufactured by each provider and sold at retail shops like CD-ROM.

In this system, the charge distributer 20 is not necessary. If the use information notice process of the third embodiment is modified in the following manner, this process for a pre-paid card can provide higher security. It is however assumed that each prepaid card is provided with an ID number "iP" and a corresponding secret key "sP".

Use Information Notice Process (1) If the money information in PPC of "A" is larger than the charge indicated in PIDi, the discrimination unit permits to use the information Pi.

(2) After "A" terminates the use of Pi or during the use, the discrimination unit subtracts the required charge from the money information PPC and the result is written in PPC.

(3) At this time, the discrimination unit sends the following use message MB to "C" where "b" is the subtracted use charge for "B".

MB={iP, {B, b, iP, TB} ^ sP}

(4) "C" deciphers MS by using the registered secret key "sP" and if correct, pays "b" yen as the distributed charge to "B".

In the above manner, the use message cannot be generated except a person knowing both "ip" and "sP".

Next, the secret key cryptosystem and public key cryptosystem will be described.

The secret key cryptosystem is a cryptosystem (also called a secret key cryptosystem, a symmetry cryptosystem, and a common use cryptosystem) in which a transmitter and a receiver share the same secret key. The secret key cryptosystem may be classified into a block cipher and a stream cipher, the former enciphering a proper length character string (block) with the same key and the latter enciphering each character string or bit with a different key. The block cipher includes a replacement cipher enciphering by replacing the order of characters and a character change cipher enciphering by changing a character to a different character. In these cases, a correspondence table of replacement and character change is used as the encipher key.

Known stream ciphers include a Vigenere cipher using a multi-table and a Vernam cipher using a onetime disposed key (the details of each cipher are referenced to Ikeno and Koyama "Modern Cipher Theory", IEICE, 1986, second and fourth paragraphs). Of the block ciphers, DES (Data Encryption Standard) and FELA (Fast Data Encipherment Algorithm) are widely used as commercial ciphers because their algorithms are made public (the details are referenced to Tsujii and Kasahara "Cipher and Information Security", Shoukoudo, 1990, second paragraph).

Since the algorithms of DES and FELA are made public, they are modified in various ways in order to prevent deciphering. For example, the number of repetitions to be described later is increased (refer to C. H. Mayer and S. M. Matyas "CRYPTOGRAPHY—A New Dimension in Computer Data Security", Willey-Interscience, Appendix D, pp. 679 to 712, 1982) and a key is changed frequently (refer to Yamamoto, Iwamura, Matsumoto, and Imai "Square Type Quasi Random Number Generator and Practical Ciphering with Block Cipher", Technical Report, IEICE, ISEC93-29, pp. 65 to 75, 1993).

Public Key Cryptosystem

In the public key cryptosystem, an encipher key and a decipher key are different, the former being made public and the latter being maintained in secret. The feature (a), protocol (b), and typical examples (c).

(a) Feature of Public Key Cipher (1) Since the encipher key and decipher key are different and the encipher key is made public, it is not necessary to send the encipher key in secret and so facilitate a despatch.

(2) The encipher key of each user is made public so that each user is required only to keep its decipher key in secret.

(3) A certification function can be achieved by which a receiver can confirm that the received communication text is not forged nor modified.

(b) Protocol of Public Key Cipher

The algorithm of a public key satisfies the following two conditions, wherein a communication sentence is represented by M, the enciphering with the public encipher key "kp" is represented by E (kp, M), and the deciphering with a secret decipher key "ks" is represented by D (ks, M).

(1) When "kp" is given, calculation of E (kp, M) is easy. When "ks" is given, calculation of D (ks, M) is easy.

(2) If "ks" is unknown, it is difficult to determine M from the viewpoint of the calculation amount even if "kp", the calculation procedure of E, and C=E (kp, M) are known.

If the following condition (3) in addition to the conditions (1) and (2) is satisfied, secret communications can be realized.

(3) For all communication texts (plain texts) M, it is possible to define E (kp, M) and the condition of D (ks, E (kp, M))=M is satisfied. Namely, since "kp" is made public, anyone can calculate E (kp, M). However, only a person having the secret key "ks" can obtain M by calculating D (ks, E (kp, M)). If the following condition (4) in addition to the conditions (1) and (2) is satisfied, certification communications can be realized.

(4) For all communication texts (plain texts) M, it is possible to define D (ks, M) and the condition of E (kp, D (ks, M))=M is satisfied. Namely, only a person having the secret key "ks" can calculate D (ks, M). Even if another person calculates D (ks', M) by using a forged secret key ks', the receiver can confirm that the information was forged because E (kp, D (ks', M)) becomes different from M. Even if D (ks, M) is forged, E (kp, D (ks, M)') becomes different from M and the receiver can confirm that the received information was forged.

In the public key cryptosystem, the process E using the public key is called enciphering, and the process D using the secret key is called deciphering. For the secret communications, the transmitter performs enciphering, and then the receiver performs deciphering. For the certification communications, the transmitter performs deciphering, and then the receiver performs enciphering.

The protocols will be explained where in a transmitter "A" uses a public key cipher and performs secret communications, certification communications, secret communications with signature, relative to the receiver "B". The secret key of "A" is represented by "ksA" and the public key of "A" is represented by "kpA", whereas the secret key of "B" is represented by "ksB" and the public key of "B" is represented by "kpB".

Secret Communications

Secret communications of a communication text (plain text) from "A" to "B" is performed by the following procedure.

Step 1: "A" enciphers M by using the public key "kpB" of "B" and sends the enciphered text C to "B".

$$C=E(kpB, M)$$

Step 2: "B" deciphers C by using the secret key "ksB" of "B" to obtain the original plain text M.

$$H=D(ksB, C)$$

Since the public key of the receiver "B" is made public, any person not limited to "A" can have secret communications with "B".

Certification Communications

Certification communications of a communication text (plain text) from "A" to "B" is performed by the following procedure.

Step 1: "A" generates a transmission text S by using the secret key "ksA" of "A" and sends it to "B".

$$S=D(ksA, M)$$

This transmission text is called a signature text and the operation of generating the signature sentence is called signature.

Step 2: "B" deciphers S by using the public key "kpA" of "A" to obtain the original plain text.

$$M=E(kpA, S)$$

If it is confirmed that M is a text having some meanings, it is certified that M has been transmitted from "A".

Since the public key of the transmitter "A" is made public, any person not limited to "B" can certify the signature text of "A".

Such certification is also called digital signature.

Certification Communications with Signature

Certification communications with signature of a communication text (plain text) from "A" to "B" is performed by the following procedure.

Step 1: "A" generates a signature text S through signature of S by using the secret key "ksA" of "A".

$$S=D(kpA, M)$$

"A" further enciphers S by using the public key "kpB" of "B" and sends the enciphered text C to "B".

$$C=E(kpB, S)$$

Step 2: "B" deciphers C by using the secret key "ksB" of "B" to obtain a signature text S.

$$S=D(ksB, C)$$

"B" further deciphers S by using the public key "kpA" of "A" to obtain the original plain text M.

$$M=E(kpA, S)$$

If it is confirmed that M is a text having some meanings, it is certified that M has been transmitted from "A".

The sequence order of the functions at each Step of the secret communications with signature may be reversed. Specifically, Step 1: C=E(kpB, D (ksA, M)) and Step 2: M=E(kpA, D (ksB, C)) may be reversed to Step 1: C=D (ksA, E (kpB, M)) and Step 2: M=D(ksB, E (kpA, C)).

(c) Typical public key cryptosystems

Typical examples of public key cryptosystems are enumerated in the following.

Cryptosystems capable of secret communications and certification communications are as follow.

RSA cryptosystem: R. L. Rivest, A. Shamir and I. Adleman "A method of obtaining digital signatures and public key cryptosystems", Comm. of ACM, 1978.

R cryptosystem: M. Rabin "Digitalized signatures and public-key cryptosystems", MIT/LCS/TR-212, Technical Report MIT. 1979.

W cryptosystem: H. C. Williamg "A modification of the RSA public-key encryption procedure", IEEE Trans. Inf. Theory, IT-26, 6, 1980.

MI cryptosystem: T. Matsumoto and H. Imai "New algorithm for public-key cryptosystems", Technical Report, IT-82-84, 1982, IEICE; and T. Matsumoto and H. Imai "A class of asymmetric cryptosystems based on polynomials over finite rings", IEEE International Symp. on Information Theory, 1983.

Cryptosystems capable of only secret communications are as follows.

MH cryptosystem: R. C. Merkle and M. E. Hellman "Hiding information and signatures in trapdoor knapsacks", IEEE Trans. Inf. Theory, IT-24, 5, 1978.

GS cryptosystem: A. Shamir and R. E. Zippel "On the security of the Merkle-Hellman cryptographic scheme", IEEE Trans. InF. Theory, IT-26, 3, 1980.

CR cryptosystem: B. Chor and R. L. Rivest "A knapsack type public key cryptosystem based on arithmetic infinite field", Proc. Crypto. 84.

M cryptosystem: R. J. McElioce "A public-key cryptosystem based on algebraic coding theory", DSN Progress Rep. Jet Propulsion Lab. 1978.

E cryptosystem: T. E. Eicamal "A public key cryptosystem and a signature scheme based on discrete logarithm", Proc. Crypto. 84, 1984.

T cryptosystem: Shigeo Tsujii "A public key cryptosystem using matrix factorization", Technical Report, IEICE, IT8512, 1985.

Cryptosystems capable of only certification communications are as follows.

S cryptosystem: A. Shamir "A fast signature scheme", report MIT/LCS/TM-107, MIT laboratory for computer science Cambridge, Mass. 1978.

L cryptosystem: K. Leiberherr "Uniform complexity and digital signature", Lecture Notes in Computer Science 115 Automata Language and Programming, Eighth Colloquium Acre, Israel, 1981.

GMY cryptosystem: S. Goldwasser, S. Micali and A. Yao "Strong signature schemes", ACM Symp. on Theory of Computing, 1983.

GMR cryptosystem: S. Goldwasser, S. Micali and R. L. Rivest "A paradoxical solution to the signature problem", ACM Symp. on Foundation of Computer Science, 1984.

OSS cryptosystem: H. Ong, C. P. Schnorr and A. Shamir "An efficient signature scheme based on quadratic equation", ACM Symp. on Theory of Computing, 1984.

OS cryptosystem: T. Okamoto and A. Shiraishi "Digital signature scheme based on polynomials calculation", IEICE, (D), J86-D, 5, 1985; and T. Okamoto and A. Shiraishi "A fast signature scheme based on quadratic inequalities", IEEE Symp. on theory of Computing, 1984.

As described so far, according to the present invention, an accounting apparatus and an accounting system solving the above conventional problems (1) to (3) of multi-media networks can be realized.

Each user can rent at low cost a variety piece of information while protecting privacy. An information provider can receive charges in accordance with a user occurrence frequency of provided information, without the management of use of provided information of each user by the information provider. By incorporating a charge distributor including retail shows and a charge accommodating person, an accounting system with charge payment function easy to use can be configured.

Many widely different embodiments of the present invention may be constructed without departing from the spirit and scope of the present invention. It should be understood that the present invention is not limited to the specific embodiments described in the specification, except as defined in the appended claims.

What is claimed is:

1. An accounting apparatus comprising:

input means for inputting money information indicating an amount of money recorded on a recording medium;

judging means for judging the money information input from said input means and outputting a permission signal for permitting a use of information provided by an information provider; and changing means for changing the money information based on a result of judging by said judging means.

2. An apparatus according to claim 1, wherein said judging means judges the money information in accordance with the money information and use charge information added to the provided information.

3. An apparatus according to claim 1, wherein said money information is cash.

4. An apparatus according to claim 1, wherein said money information is recorded in a recording medium.

5. An information receiving apparatus for receiving information provided by an information provider, comprising:

input means for inputting money information indicating an amount of money recorded on a recording medium;

judging means for judging the money information input from said input means and outputting a permission signal for permitting a use of information provided by an information provider; and changing means for changing the money information based on a result of judging by said judging means.

6. An information receiving apparatus according to claim 5, wherein said judging means judges the money information in accordance with the money information and use charge information added to the provided information.

7. An information receiving apparatus according to claim 5, wherein said money information is cash.

8. An information receiving apparatus according to claim 5, wherein said money information is recorded in a recording medium.

9. An information receiving apparatus according to claim 5, further comprising communication means for transmitting use information of the provided information.

10. A communication system comprising:

an information provider terminal for providing information including first money information;

a user terminal for receiving and using information provided by said information provider terminal and second money information; and an accounting unit inputted with the first money information and the second money information, and having means for comparing the first money information and the second money information, outputting a permission signal for permitting a use of the information provided by said information provider terminal according to a result of the comparison, and altering the second money information.

11. A communication system according to claim 10, wherein said judging means judges the money information in accordance with the money information and use charge information added to the provided information.

12. A communication system according to claim 10, wherein said money information is cash.

13. A communication system according to claim 10, wherein said money information is recorded in a recording medium.

14. A communication system according to claim 10, further comprising communication means for transmitting use information of the provided information.

15. A communication system according to claim 14, further comprising a charge distributor terminal for transmitting charge distribution information to said information provider terminal in accordance with the use information.

16. A communication system according to claim 14, further comprising a charge accommodating terminal for performing accommodation of a use charge of the provided information in accordance with the use information.

17. A communication system according to claim 10, wherein cipher communication is performed between said terminals.

18. A device in operation with a terminal from which a user uses information provided from an information provider, comprising:
  means for inputting first data indicating an amount of money;
  means for inputting second data regarding the information provided from the information provider;
  judging means for judging whether a use of the information at the terminal can be permitted or not, in accordance with the first and second data; and
  means for rewriting the amount of money in response to a judgment operation of said judging means,
    wherein said judging means transmits the judgment result of a use permission to the external of the device.

19. A device according to claim 18, wherein said second data includes a use charge, and said judging means judges a use permission of the information by comparing the amount of money and the use charge.

20. A device according to claim 18, wherein said first data includes data indicating the type of a recording medium in which said first data is recorded, and said judging means judges a use permission of the information in accordance with the data indicating the type.

21. A device according to claim 18, further comprising means for outputting a use state of the information to the external of the device in response to a judgement operation of said judging means.

22. A device according to claim 21, further comprising means for rewriting the amount of money in response to a judgement operation of said judging means, and means for notifying a use state of the information to the external of the device, synchronously with the operation of said rewriting means.

* * * * *

UNITED STATES PATENT AND TRADEMARK OFFICE
CERTIFICATE OF CORRECTION

PATENT NO. : 5,937,395

DATED : August 10, 1999

INVENTOR(S): KEIICHI IWAMURA

Page 1 of 3

It is certified that error appears in the above-identified patent and that said Letters Patent is hereby corrected as shown below:

References Cited [56]

OTHER PUBLICATIONS

In "R.L. Rivest, ...etc.", "A method..... cryptosystems," should read --"A method..... cryptosystems,"--.

ABSTRACT

Line 6, "an" should read --a--.

COLUMN 1

Line 54, "unites" should read --units--.

COLUMN 2

Line 7, "rent" should read --rented--.

UNITED STATES AND TRADEMARK OFFICE
CERTIFICATE OF CORRECTION

PATENT NO. : 5,937,395

DATED : August 10, 1999

INVENTOR(S): KEIICHI IWAMURA

It is certified that error appears in the above-identified patent and that said Letters Patent is hereby corrected as shown below:

<u>COLUMN 4</u>

Line 10, "that" should read --of--.
    Line 12, "that" should read --of--.
    Line 13, "what" should read --what number of--.

<u>COLUMN 5</u>

Line 13, "like" should be deleted.

<u>COLUMN 13</u>

Line 56, "where in" should read --wherein--.

UNITED STATES PATENT AND TRADEMARK OFFICE
CERTIFICATE OF CORRECTION

PATENT NO. : 5,937,395

DATED : August 10, 1999

INVENTOR(S): KEIICHI IWAMURA

Page 3 of 3

It is certified that error appears in the above-identified patent and that said Letters Patent is hereby corrected as shown below:

COLUMN 14

Line 63, "c) Typical public key cryptosystems" should read --c) Typical Public Key Cryptosystems--.
    Line 67, "follow." should read --follows.--.

COLUMN 15

Line 7, "H.C. Williamg" should read --H.C. Williams--.
    Line 39, "science" should read --science,--.

Signed and Sealed this

Eighth Day of August, 2000

Attest:

Q. TODD DICKINSON

*Attesting Officer*     *Director of Patents and Trademarks*